(No Model.) 3 Sheets—Sheet 1.
W. FALCONER.
LAND LEVELER.
No. 500,874. Patented July 4, 1893.
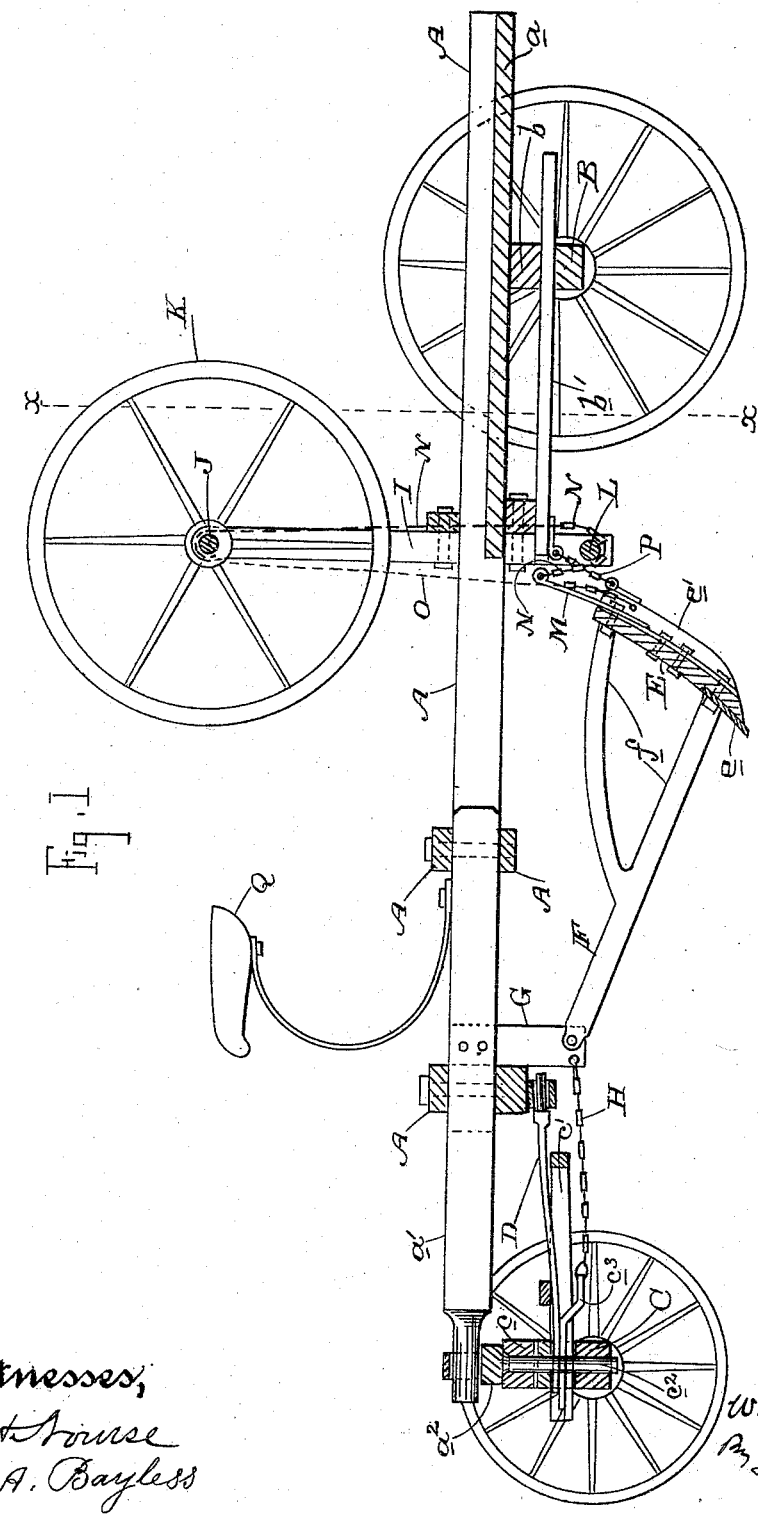
Witnesses:
Inventor,
William Falconer

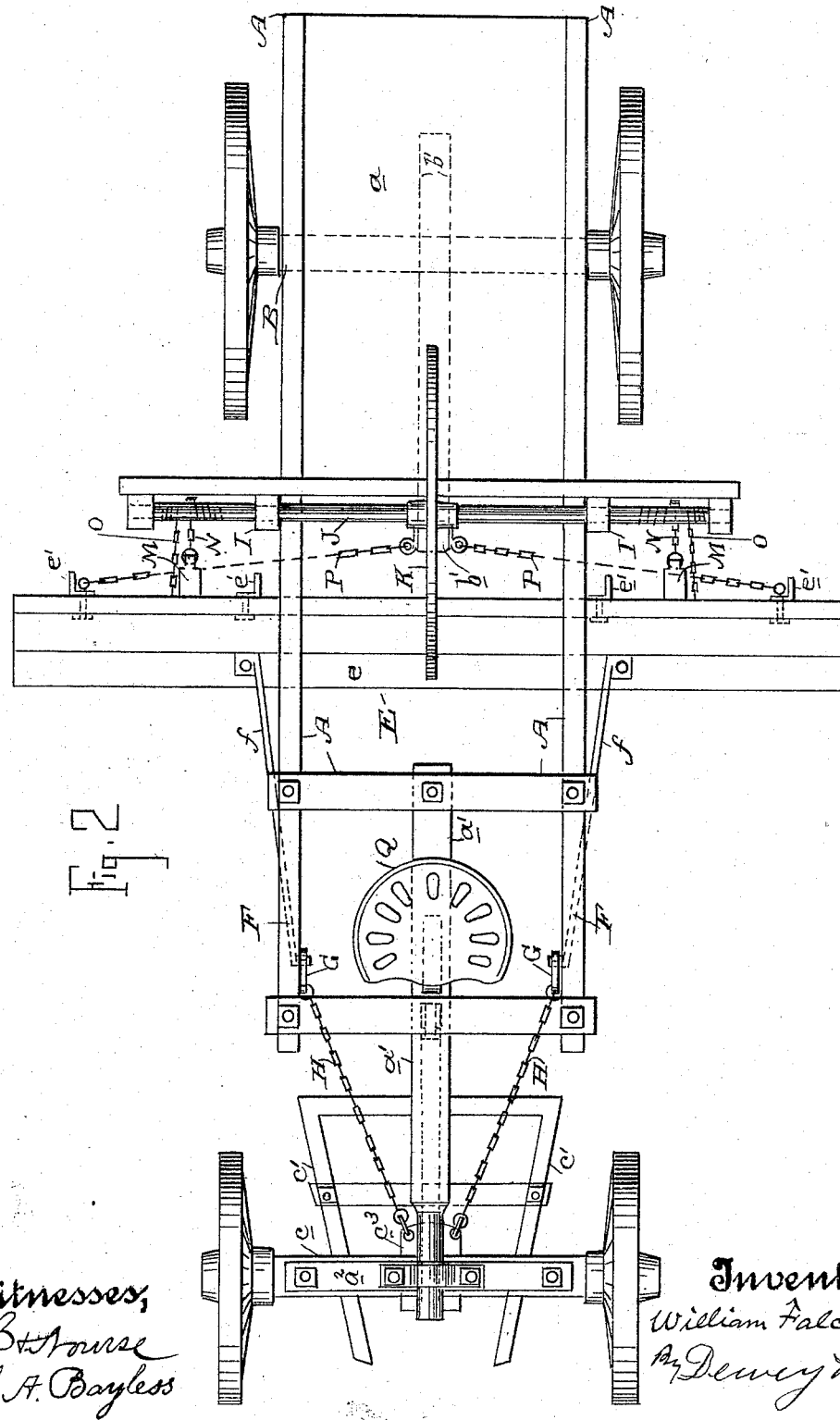

(No Model.) 3 Sheets—Sheet 3.
W. FALCONER.
LAND LEVELER.
No. 500,874. Patented July 4, 1893.
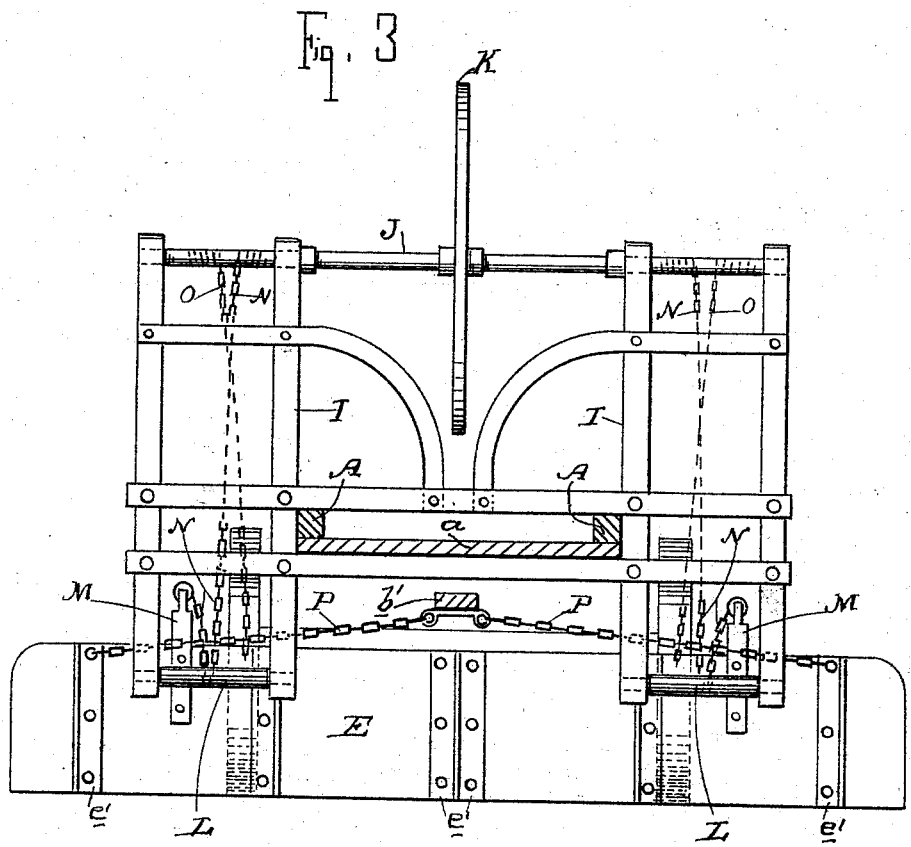
Witnesses,
J. Strouse
J. A. Bayless
Inventor,
William Falconer
By Dewey & Co.
Attys

UNITED STATES PATENT OFFICE.

WILLIAM FALCONER, OF SELMA, CALIFORNIA.

LAND-LEVELER.

SPECIFICATION forming part of Letters Patent No. 500,874, dated July 4, 1893.

Application filed September 1, 1892. Serial No. 444,837. (No model.)

*To all whom it may concern:*

Be it known that I, WILLIAM FALCONER, a citizen of the United States, residing at Selma, Fresno county, State of California, have invented an Improvement in Land-Levelers; and I hereby declare the following to be a full, clear, and exact description of the same.

My invention relates to the general class of earth scrapers designed for leveling land.

It consists in a scraper carrying-frame constructed and adapted to be readily and quickly applied to the running gear of any farm or other country wagon, said frame having novel mechanism for lifting and depressing the scraper.

It also consists in the novel constructions and combinations hereinafter fully described and specifically pointed out in the claims.

The object of my invention is to provide a land leveler which can be readily, easily and quickly applied to the running gear of any ordinary wagon by simply removing its bed, uncoupling the reach and setting the scraper frame on the wheeled axles. Also to provide a land leveler having a peculiarly mounted scraper with simple, convenient and effective means for raising it from and for depressing it into the ground.

Referring to the accompanying drawings for a more complete explanation of my invention,—Figure 1 is a longitudinal vertical section of my land leveler. Fig. 2 is a plan of same. Fig. 3 is a cross section on line $x$—$x$ of Fig. 1.

A is the frame of my land leveler composed of suitable longitudinal and cross bars, the rear portion being provided with a platform $a$ on which the operator is to stand, and its front portion having a forwardly projecting shaft $a'$ axially pivoted or journaled at its front end in a false cross bolster $a^2$. The rear portion of this frame is adapted to be mounted and secured upon the bolster $b$ of the rear wheeled axle B of any wagon, and to rest upon the reach $b'$ extending forwardly from said axle. The false bolster $a^2$ at the front is to be secured upon top of the head block $c$ of the front wheeled axle C of the wagon, said axle being provided with the usual hounds $c'$. The two axles of the wagon are easily separated by uncoupling the reach, and the frame A being secured upon them in the manner described, forms the connecting frame between the two instead of the ordinary bed or frame thereof. A limiting bar D is mounted at its forward end on the king bolt $c^2$ of the forward axle and it thence extends backwardly, through and between the hounds $c'$ and is pivotally mounted or journaled by means of its rounded rear end in the forward end of the frame A. This bar guides and limits the hounds of the forward axle and holds them well in place, preventing them from undue up and down movement.

E is the scraper having the bit $e$ at its lower end. This scraper is preferably made of a heavy plank or planks braced at the back by iron braces $e'$ preferably angle irons. The bit $e$ is bolted or otherwise secured to the lower side of the scraper. Secured in a suitable manner to the face of the scraper and extending forwardly are the arms or forks $f$ of the draft links F, the forward ends of said links being pivotally connected at $f'$ with the lower ends of hangers G secured to the frame above. To these same hangers are attached the draft chains H which converge forwardly from each side, and are attached to the king bolt $c^2$ of the forward axle through the intervention of a bar $c^3$. By this connection it will be seen that the draft is directly through the chains and links upon the scraper, the depending hangers acting merely as guides to carry the links and chains, and as bearings for the pivotal connection of the former.

On each side of the frame A, about its middle, are secured the standards I, in the upper ends of which is mounted a shaft J upon the center of which is carried the operating hand-wheel K whereby said shaft is rotated. In the lower ends of the standards are mounted anti-friction rollers, in the shape of pulleys, if desired, or preferably in the shape of long rollers L, as here shown.

Secured to the back of the scraper is an uprising arm M, one near each end.

N is a chain which is secured at one end upon the shaft J above and thence passes down to and around the roller L and up to the top of the arm M to which it is secured. There is one of these chains on each side.

O is a chain, the upper end of which is secured to and winds upon the shaft above in an opposite direction to the winding of chain N. The lower end of chain O is secured to the back of the scraper top, preferably to the top of the angle iron braces $e'$ on the back of said scraper. There is one of said chains on each side of the frame. The attachment of the upper ends of these chains is such that the end of chain N crosses the plane of the end of chain O, and said ends are secured on opposite sides to the shaft whereby they wind inwardly toward each other and are thus enabled to be laid up straight in winding on the shaft. It will be seen that by turning the hand-wheel K in one direction the chains O will be wound up, while the chains N will be paid out thereby lifting the scraper about its pivotal connections at the ends of its links F. By reversing the movement of the hand-wheel, the chains N will be wound up on the shaft while the chains O will be paid out, and this winding up of the chains N will, through their connections with the scraper, force said scraper down to take the earth.

The scraper is held in position laterally and prevented from swinging unduly from side to side by means of the chains P which are secured to its back near each end thereof and thence extend inwardly to and are secured to the forward end of the reach $b'$ of the running gear.

Q is the driver's seat mounted upon the frame A.

It will be seen that the connection between the frame A and the forward axle of the running gear is such as will permit said axle to have a free lateral movement independently of the frame. This is effected by the axially pivoted connection of the front shaft $a'$ of the frame in the false bolster $a^2$ and the similar pivotal connection of the limiting bar D of the hounds with said frame. Therefore, the forward axle can tilt sidewise and can travel over uneven and unequal surfaced ground, either of its front wheels dropping into ruts or holes without transferring any strain to the scraper frame which is not affected by the movement of the front axle. This is of great advantage in the particular use to which the machine is to be applied, namely, in leveling off that unlevel ground termed locally "hog-wallow" ground.

Having thus described my invention, what I claim as new, and desire to secure by Letters Patent, is—

1. In a land leveler, the frame thereof adapted to be secured on the rear wheeled-axle, said frame having at its rear end a platform, and at its forward portion the forwardly projecting shaft, and a front wheeled-frame having a bearing in which the shaft is axially mounted, substantially as herein described.

2. In a land leveler, the frame thereof adapted to be secured on the rear wheeled-axle and having at its front the forwardly extending shaft $a'$, a front wheeled-axle in which said shaft is axially mounted, a scraper carried by the frame, the draft links having forked ends secured to the scraper, and connections between said links and the king bolt of the forward axle, substantially as herein described.

3. In a land leveler, the combination of the frame mounted at its rear upon the rear wheeled-frame and having at its forward end the shaft $a'$ the forward wheeled axle having the head block, the false cross-bolster secured to said head block and having a bearing in which the forwardly projecting shaft is axially mounted, a scraper carried by the frame, and the draft connections between the same and the king bolt of the forward axle, substantially as herein described.

4. In a land leveler, the combination of a frame having a forwardly projecting shaft and a false cross bolster upon which the forward end of said shaft is axially pivoted, said frame being adapted at its rear end to be mounted upon a rear wheeled axle, and its false cross bolster being adapted to be mounted upon the head-block of a forward wheeled axle, a scraper carried by the frame, and draft connections between said scraper and the king bolt of the forward axle, substantially as herein described.

5. A land leveler consisting of a frame having the forwardly projecting shaft, a rear wheeled axle upon which the rear end of the frame is mounted, a forward wheeled axle with head-block and hounds, a false bolster secured to the top of said head-block and in which the forward end of the frame shaft is journaled, the limiting bar mounted upon a king-bolt and passing through between the hounds, said guide being journaled in the front of the frame, a scraper carried by the frame, and draft connections between said scraper and the king-bolt of the forward axle, substantially as herein described.

6. A land leveler consisting of a frame having the forwardly projecting shaft, a rear wheeled axle upon which the rear end of the frame is mounted, a forward wheeled axle with king-bolt and head-block upon which the frame shaft is journaled, a scraper carried by the frame, and the draft connections between said scraper and the king-bolt of the forward axle, consisting of the forked links, the hangers to which said links are pivoted and the draft chains connected with said hangers and with the king-bolt, substantially as herein described.

7. In a land leveler, a wheeled frame, in combination with a scraper suspended from said frame having the upwardly extending arms and the means for raising and lowering said scraper, consisting of the rotary shaft mounted on the frame above, the guide rollers below, the chains N wound upon said shaft above passing around the rollers below and connected with arms of the scraper, the scraper, and the chains O wound upon the shaft above in opposite directions to the chains N and secured below to the scraper, substantially as herein described.

8. In a land leveler, a wheeled frame and a scraper pivotally connected with said frame whereby it may be raised and lowered, said scraper having the upwardly projecting arms M in combination with the means for raising and lowering the scraper, consisting of the shaft mounted in standards rising from the frame, the hand-wheel of the shaft, the guide rollers in the lower ends of the standards, the chains N wound on the shaft passing around the guide rollers below and secured to the uprising arms of the scraper, and the chains O wound in an opposite direction on the shaft and secured below to the scraper, substantially as herein described.

9. In a land leveler, the wheeled frame and the scraper having the links pivotally connected with said frame, in combination with the rotary shaft with its hand-wheel, the oppositely wound chains N and O on said shaft and connected with the scraper below, the rollers by which the chains N are guided and the chains P secured to the scraper and to a fixed bearing for holding said scraper from lateral movement, substantially as herein described.

In witness whereof I have hereunto set my hand.

WILLIAM FALCONER.

Witnesses:
ALONZO M. TERRY,
W. E. KNOWLES.